(12) United States Patent
Eivaz

(10) Patent No.: US 11,289,933 B2
(45) Date of Patent: Mar. 29, 2022

(54) BATTERY CHARGING ENCLOSURE

(71) Applicant: Ahmad Eivaz, San Marcos, CA (US)

(72) Inventor: Ahmad Eivaz, San Marcos, CA (US)

( * ) Notice: Subject to any disclaimer, the term of this patent is extended or adjusted under 35 U.S.C. 154(b) by 327 days.

(21) Appl. No.: 16/413,512

(22) Filed: May 15, 2019

(65) Prior Publication Data

US 2020/0366114 A1 Nov. 19, 2020

(51) Int. Cl.
*H02J 7/00* (2006.01)
*H01M 10/613* (2014.01)

(52) U.S. Cl.
CPC ......... *H02J 7/0091* (2013.01); *H01M 10/613* (2015.04); *H02J 7/0042* (2013.01)

(58) Field of Classification Search
CPC .......... H02J 7/0091; H02J 7/0042; H02J 7/00; H02J 7/0029; H02J 7/007188; H02J 7/0088; H01M 10/613; H01M 10/425; H01M 10/441; H01M 10/482; H01M 10/486; H01M 10/6563; H01M 50/204; H01M 50/222; H01M 50/231; H01M 50/24; H01M 10/052; H01M 10/0565; Y02E 60/10
See application file for complete search history.

(56) References Cited

U.S. PATENT DOCUMENTS

| | | | | |
|---|---|---|---|---|
| 6,318,965 B1 * | 11/2001 | Nair | ...................... | F04D 27/004 417/2 |
| 6,544,210 B1 * | 4/2003 | Trudel | ................... | A61B 18/00 604/26 |
| 6,775,134 B2 * | 8/2004 | Chen | ........................ | G06F 1/20 165/122 |
| 8,815,164 B1 * | 8/2014 | Al Azemi | ................. | A61L 9/03 422/125 |
| 9,829,953 B2 * | 11/2017 | Reade | .................... | G06F 1/3212 |
| 2001/0045813 A1* | 11/2001 | Suzuki | ............... | H02J 7/00047 320/110 |
| 2002/0191430 A1* | 12/2002 | Meir | ........................ | G06F 1/20 363/141 |
| 2004/0135553 A1* | 7/2004 | Sakakibara | .......... | H01M 10/46 320/150 |
| 2004/0257089 A1* | 12/2004 | Aridome | ............. | H01M 10/613 324/430 |
| 2005/0156564 A1* | 7/2005 | Krieger | ................. | H01M 50/20 320/112 |

(Continued)

FOREIGN PATENT DOCUMENTS

| CN | 101740840 A | * | 6/2010 | |
|---|---|---|---|---|
| CN | 103733497 A | * | 4/2014 | .......... H05K 5/0086 |

(Continued)

*Primary Examiner* — Stacy Whitmore
(74) *Attorney, Agent, or Firm* — CP Law Group PC; Cy Bates

(57) ABSTRACT

The disclosure concerns a battery charging enclosure which includes an outer shell and lid portion each covered by a fire protective insulation layer forming an internal volume of the enclosure, wherein a battery is housed within the internal volume, and various safety features for preventing catastrophic charging-related events are implemented. Certain safety features include, disabling air-flow through the internal volume upon detection of smoke, fire, lid-opening event, or a change of orientation of the enclosure. Other features and aspects concerning the battery charging enclosure are further described herein.

15 Claims, 4 Drawing Sheets

(56) References Cited

U.S. PATENT DOCUMENTS

| | | | |
|---|---|---|---|
| 2007/0072061 A1* | 3/2007 | Shimizu | H01M 10/625 |
| | | | 429/62 |
| 2007/0237636 A1* | 10/2007 | Hsu | F04D 29/005 |
| | | | 416/5 |
| 2013/0288087 A1* | 10/2013 | Nomura | H01M 10/6563 |
| | | | 429/61 |
| 2014/0242493 A1* | 8/2014 | Irvine | H01M 8/0282 |
| | | | 429/455 |
| 2015/0048799 A1* | 2/2015 | Wey | H01M 10/4207 |
| | | | 320/134 |
| 2016/0072329 A1* | 3/2016 | Miller | H02J 7/0029 |
| | | | 320/104 |
| 2017/0288435 A1* | 10/2017 | Miller | G06F 1/263 |
| 2018/0307284 A1* | 10/2018 | Saravis | G06F 1/1632 |
| 2019/0011964 A1* | 1/2019 | Kosugi | G06F 1/3206 |
| 2020/0128672 A1* | 4/2020 | Silha | H02J 7/0045 |
| 2021/0028507 A1* | 1/2021 | Su | H02J 7/0013 |

FOREIGN PATENT DOCUMENTS

| | | | | |
|---|---|---|---|---|
| CN | 204375857 U | * | 6/2015 | |
| CN | 105656113 A | * | 6/2016 | H02J 7/0031 |
| CN | 205429706 U | * | 8/2016 | |
| CN | 207587799 U | * | 7/2018 | |
| CN | 108878718 A | * | 11/2018 | |
| FR | 2916579 A1 | * | 11/2008 | H01M 10/46 |
| WO | WO-9222099 A1 | * | 12/1992 | H02J 7/00047 |

* cited by examiner

BATTERY CHARGING ENCLOSURE

BACKGROUND

Field of the Invention

The invention relates to battery charging enclosures; and more particularly, to a battery charging enclosure with integrated features for protection against catastrophic charging-related events.

Description of the Related Art

A lithium-ion polymer battery (abbreviated as LiPo, LIP, Li-poly, lithium-poly) is a rechargeable battery of lithium-ion technology. These batteries provide higher specific energy than other lithium battery types and are used in applications where weight is a critical feature, like mobile devices and radio-controlled aircraft.

Lithium polymer cells have evolved from lithium-ion and lithium-metal batteries. The primary difference is that instead of using a liquid lithium-salt electrolyte (such as LiPF6) held in an organic solvent (such as EC/DMC/DEC), the battery uses a solid polymer electrolyte (SPE) such as poly(ethylene oxide) (PEO), poly(acrylonitrile) (PAN), poly(methyl methacrylate) (PMMA) or poly(vinylidene fluoride) (PVdF).

The solid electrolyte can be typically classified as one of three types: dry SPE, gelled SPE and porous SPE.

A typical cell has four main components: positive electrode, negative electrode, separator and electrolyte. The separator itself may be a polymer, such as a microporous film of polyethylene (PE) or polypropylene (PP); thus, even when the cell has a liquid electrolyte, it will still contain a "polymer" component. In addition to this, the positive electrode can be further decomposed in three parts: the lithium-transition-metal-oxide (such as LiCoO2 or LiMn2O4), a conductive additive, and a polymer binder of poly(vinylidene fluoride) (PVdF). The negative electrode material may have the same three parts, with carbon replacing the lithium-metal-oxide.

Just as with other lithium-ion cells, LiPos work on the principle of intercalation and de-intercalation of lithium ions from a positive electrode material and a negative electrode material, with the liquid electrolyte providing a conductive medium. To prevent the electrodes from touching each other directly, a microporous separator is in between which allows only the ions and not the electrode particles to migrate from one side to the other.

The voltage of a LiPo cell depends on its chemistry and varies from about 2.7V-3.0V (discharged) to about 4.2V (fully charged), for cells based on lithium-metal-oxides (such as LiCoO2), and around 1.8V-2.0V (discharged) to 3.6V-3.8V (charged) for those based on lithium-iron-phosphate (LiFePO4).

The exact voltage ratings are generally specified in product data sheets, with the understanding that the cells should be protected by an electronic circuit that won't allow them to overcharge nor over-discharge under use.

For LiPo battery packs with cells connected in series, a specialized charger may monitor the charge on a per-cell basis so that all cells are brought to the same state of charge (SOC).

Unlike lithium-ion cylindrical and prismatic cells, which have a rigid metal case, LiPo cells have a flexible, foil-type (polymer laminate) case, so they are relatively unconstrained. LiPo cells are over 20% lighter than equivalent cylindrical cells of the same capacity.

Being lightweight is an advantage when the application requires minimum weight, as in the case of radio-controlled aircraft. However, it has been established that moderate pressure on the stack of layers that compose the cell results in increased capacity retention, because the contact between the components is maximized and delamination and deformation is prevented, which is associated with increase of cell impedance and degradation.

LiPo cells provide manufacturers with compelling advantages. They can easily produce batteries of almost any desired shape. For example, the space and weight requirements of mobile devices and notebook computers can be completely satisfied. Also, they have low-self discharge rate, which is about 5% per month.

LiPo cells are affected by the same problems as other lithium-ion cells. Accordingly, problems such as overcharge, over-discharge, over-temperature, short circuit, crush and nail penetration may all result in a catastrophic failure, including the pouch rupturing, the electrolyte leaking, and fire.

There is a continued need for improvements which embrace the use and charging of LiPo batteries, but which concurrently mitigate the incidence and significance of catastrophic charging-related events.

SUMMARY

The disclosure concerns a battery charging enclosure with integrated features for protection against catastrophic charging-related events.

BRIEF DESCRIPTION OF THE DRAWINGS

These and other features and aspects are described in the appended details and descriptions, particularly when referenced in conjunction with the following drawings, wherein.

DETAILED DESCRIPTION

For purposes of explanation and not limitation, details and descriptions of certain preferred embodiments are hereinafter provided such that one having ordinary skill in the art may be enabled to make and use the invention. These details and descriptions are representative only of certain preferred embodiments, however, and a myriad of other embodiments which will not be expressly described will be readily understood by one having skill in the art upon a thorough review of the instant disclosure. Accordingly, any reviewer of the instant disclosure should interpret the scope of the invention by the claims, as such scope is not intended to be limited by the embodiments described and illustrated herein.

General Embodiment

In a general embodiment, a battery charging enclosure is disclosed which includes an outer shell, including a receptacle portion and a lid portion, each being covered by a fire protective insulation layer which defines an internal volume of the enclosure. A battery is provided and housed within the internal volume during charging, and various safety features for preventing catastrophic charging-related events are implemented. Certain safety features include: disabling air-flow through the internal volume upon detection of smoke, fire, lid-opening event, or a change of orientation of the enclosure. By disabling air-flow, the fire or smoke can be contained within the battery charging enclosure. Other features and aspects concerning the battery charging enclosure are further described herein.

The battery charging enclosure is particularly useful for charging one or more LiPo batteries; however it may be similarly configured for charging other batteries either alone or in combination with LiPo batteries.

Illustrated Embodiment

Now turning to the drawings, wherein the invention, including various features and aspects related therewith, are described in accordance with an illustrated embodiment. While a particular illustrated embodiment is provided for purposes of enabling the disclosure, it will be appreciated by one having skill in the art that the various features and advantages of the described battery charging enclosure may be practiced in other arrangements or combinations that depart from the illustrated embodiment, but which are deemed to remain within the spirit and scope of the invention as-claimed. Thus, nothing in the descriptions and drawings concerning the illustrated embodiment is intended to limit the scope of the invention.

Figure 1:
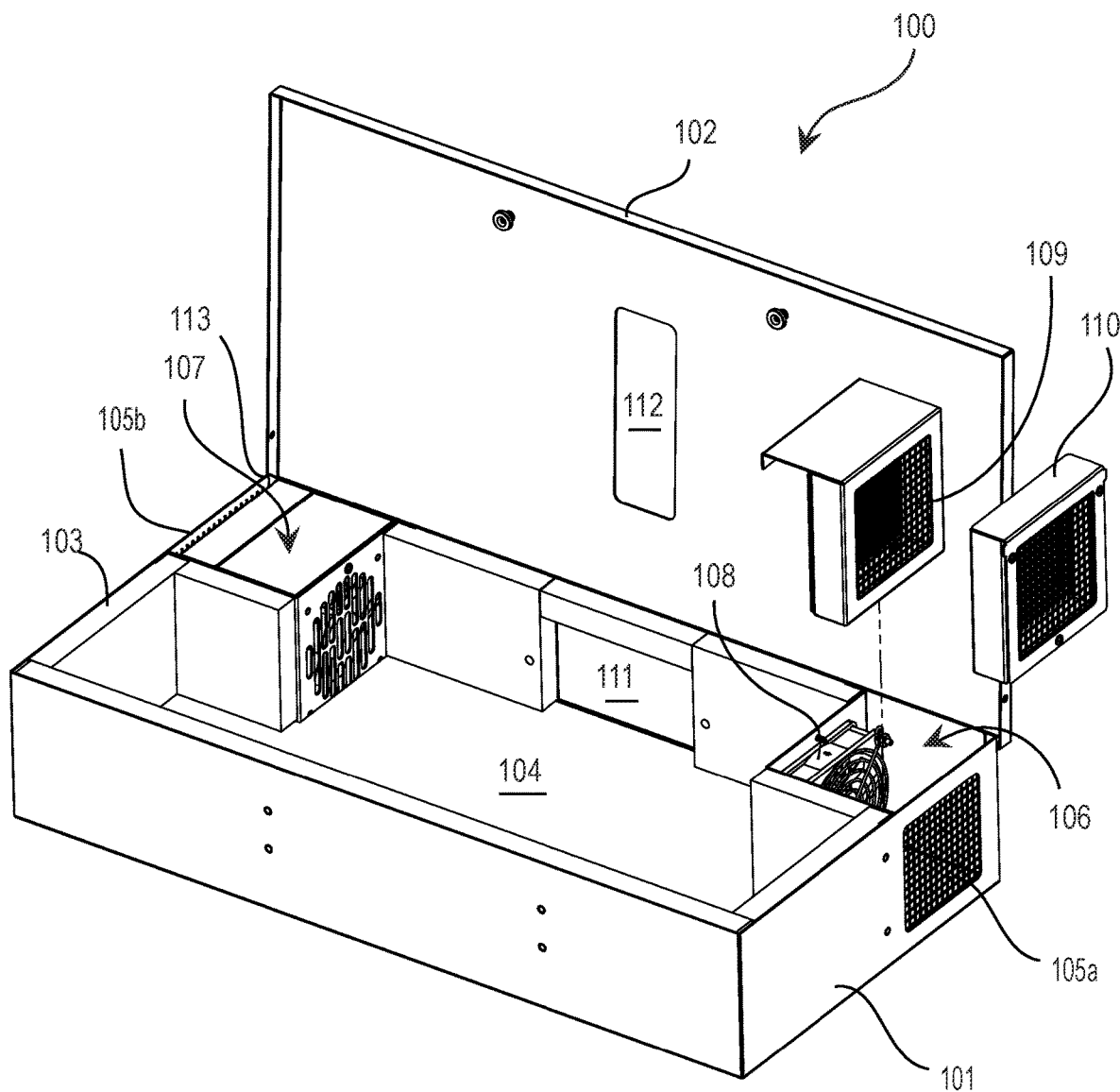
FIG. 1 shows a semi-exploded view of a battery charging enclosure in accordance with an illustrated embodiment.

FIG. 1 shows a semi-exploded view of a battery charging enclosure in accordance with an illustrated embodiment.

The battery charging enclosure 100 includes an outer shell comprising a receptacle portion 101 and a lid portion 102. The lid portion is preferably coupled to the receptacle portion via a hinge 113 extending therebetween; however, the lid may be magnetically sealed to the receptacle portion, or otherwise attached in accordance with any of a myriad of techniques appreciated by one having skill in the art.

One, or preferably both, of the lid portion and the receptacle portion are configured with an insulation layer 103 attached or positioned in a manner sufficient to cover the inside portions thereof, and to define an interior volume 104 of the battery charging enclosure.

The receptacle portion comprises a first air-flow screen 105a and a second air-flow screen 105b disposed about one or more walls of the enclosure (receptacle portion and lid portion). In a preferred embodiment, the first and second air-flow screens are disposed at opposite sides of the battery charging enclosure. As further described below, air-flow is communicated through the air-flow screens for ventilating the interior volume.

A first fan assembly 106 is shown positioned at a first side of the battery charging enclosure, whereas a second fan assembly 107 is shown positioned at a second side of the battery charging enclosure as defined in the drawings. Each of the first and second fan assemblies is disposed adjacent to one of the air-flow screens (105a; 105b), respectively, and independently comprises an electric fan 108 and one or more of: mesh 109 and spheres 110 (mesh and/or spheres may be independently contained in a cartridge as shown) each configured to communicate airflow and concurrently block escaping flames in the event of a fire. The first fan assembly is configured to communicate air flow from an external environment into the interior volume of the battery charging enclosure (intake). The second fan assembly, however, is configured to communicate air flow from within the interior volume of the enclosure to the external environment (exhaust). One with skill in the art will appreciate that the first and second fan assemblies may each be positioned at one of the first and second sides of the enclosure (same or opposite sides), or elsewhere about the enclosure to promote the respective air-flow dynamics. Air flow will help to cool the battery during charging for preventing over-heating. Meanwhile, controlling air flow will enable fire protection and aid in containment of smoke.

A cable-routing aperture 111 is provided, preferably through a side wall of the receptacle portion, such as the rear side as-shown, though may optionally be integrated through the lid portion.

The lid portion is shown with an optional view-window 112. In certain embodiments, the view window may be embedded within the receptacle portion of the enclosure as opposed to the lid portion as-shown.

Figure 2:
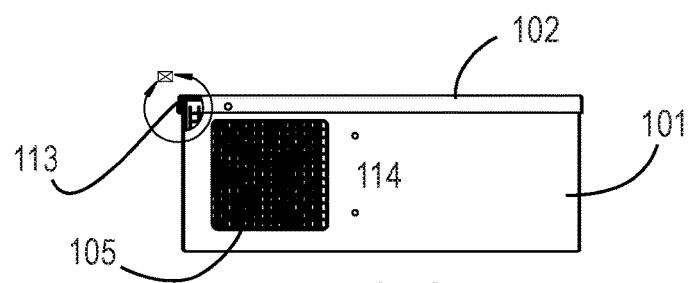
FIG. 2 shows a left-side plan view of the battery charging enclosure.

FIG. 2 shows a left-side plan view (second side) of the battery charging enclosure. Here, the lid portion 102 is shown in a closed configuration with respect to the receptacle portion 101, and the hinge portion 113 of the preferred embodiment is identified (see FIG. 7 for an exploded view). An air-flow screen 105 is shown, as well as optional fasteners 114 for adjoining the insulation layer (which can be fastened to the outer shell via screws, glue, or similar adjoining elements).

Figures 3, 4, 5:
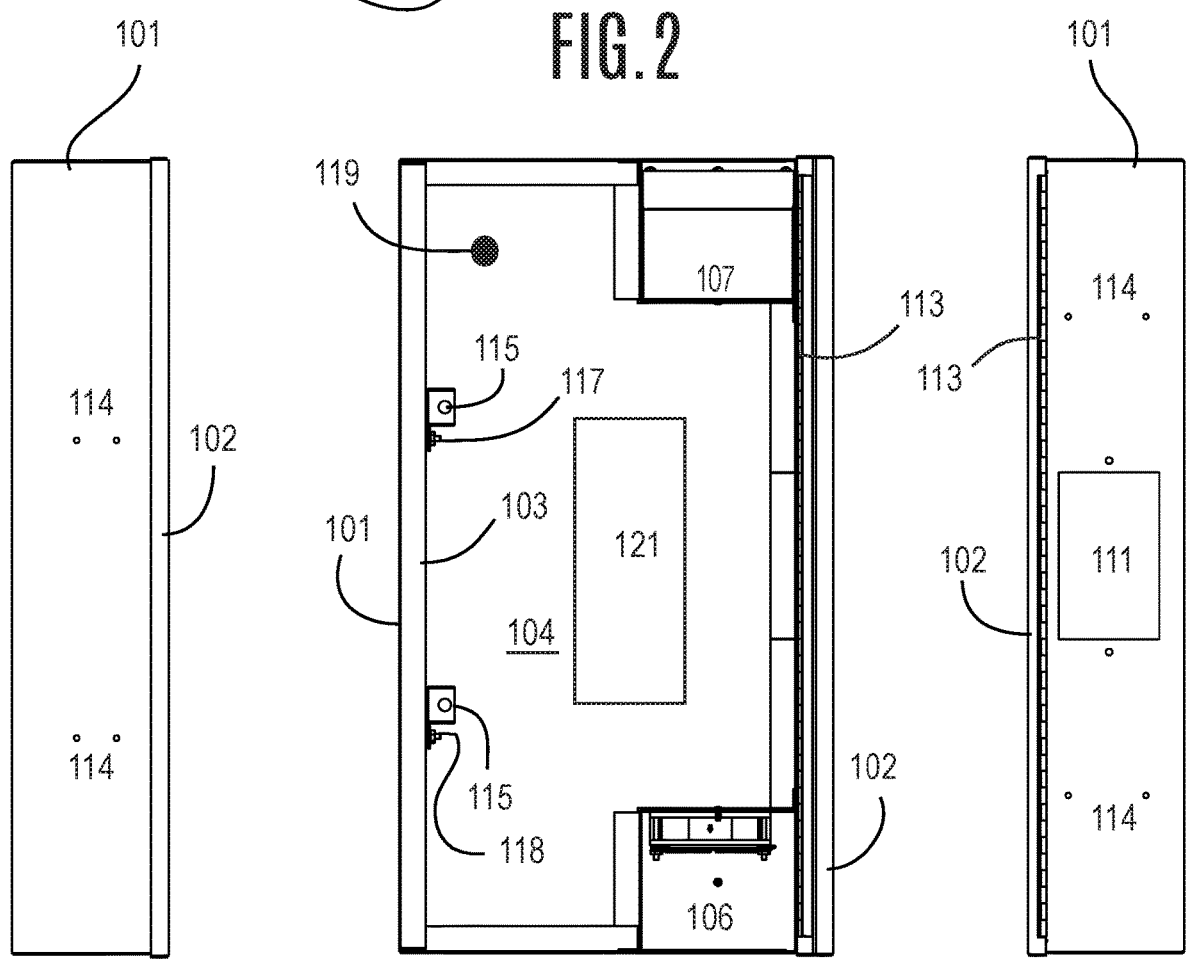
FIG. 3 shows a front plan view of the battery charging enclosure.
FIG. 4 shows a top plan view of the battery charging enclosure with lid portion removed.
FIG. 5 shows a rear plan view of the battery charging enclosure.

FIG. 3 shows a front plan view of the battery charging enclosure. Again, the lid portion 102 is shown in a closed configuration with respect to the receptacle portion 101 in this drawing. Optional fasteners 114 are shown for adjoining the insulation layer (which can optionally be fastened to the outer shell via screws, glue, or similar adjoining elements).

FIG. 4 shows a top plan view of the battery charging enclosure with the lid portion extended perpendicularly (out of page) in an open configuration. From this view is apparent the outer shell of the receptacle portion 101 and lid portion 102, insulation layer 103, interior volume 104, and first and second fan assemblies 106; 107, respectively. Also shown are two lid sensors 115 which are configured to detect each of a lid-open and lid-closed state. While two lid sensors are preferred, only one lid-sensor is required. The lid sensors are preferably a magnetic contact sensor, such as those used in conventional alarm systems; however, any sensor capable of distinguishing between the lid-open and lid-closed states can be similarly implemented, such as a pin-switch or other sensor.

Componentry is shown, such as: a smoke detector 117, a flash detector 118, a temperature sensor 119, lid sensor(s) 115 are shown. Placement of the componentry can be varied depending on manufacturer or consumer preferences; however, lid sensors are generally positioned at a meeting of the receptacle portion and lid portion (away from the hinge).

The smoke detector generally comprises any gas sensor capable of detecting smoke from within the interior volume of the enclosure; however, any component capable of detecting smoke, such as visual and other sensors may be similarly implemented. An example of a suitable gas sensor includes the MQ-135 Gas Sensor available from OLIMEX (https://www.olimex.com/Products/Components/Sensors/SNS-MQ135/). Other examples include a photoelectric smoke detector integrated circuit or ionization smoke detector with interconnect and timer, or other similar sensors as may be commercially obtained and available from ALLEGRO MICROSYSTEMS (https://www.allegromicro.com/en/Products/Motor-Driver-And-Interface-ICs/Photo-and-Ion-Smoke-Detector-ICs.aspx). In this regard, the smoke detector can detect smoke within the interior volume of the battery charging enclosure and trigger the disabling of power to the battery charging port and/or fan assemblies.

The flash detector generally comprises any component capable of detecting flash or fire. An Example of a flash detector is the Honeywell C7027A1023 Ultraviolet Flame Detector (https://cutomer.honeywell.com/en-US/Pages/default.aspx). In this regard, the flash detector can detect fire and trigger the disabling of power to the battery charging port and/or fan assemblies.

The lid sensors generally comprise magnetic contact sensors, such as IDEM Non-Contact Magnetic Safety Switches, for example the MPR-114013, or pin-switches such as those commonly used in automotive applications, or in another example, those from OMRON ELECTRONICS part number SS-5GL13T. In this regard, the battery charging enclosure can be configured to disable power to the battery charging port and/or fan assemblies upon detecting the lid in a lid-open state.

The battery charging enclosure can optionally include an accelerometer or tilt sensor 120. An example of a suitable tilt sensor includes the HDX SEN-0000400 available from ODDWIRES (https://www.oddwires.com/tilt-ball-switch-sensor/), though any of a myriad of possible accelerometer/tilt sensor components known to one with skill in the art may selected and implemented in the various embodiments. In this regard, the accelerometer or tilt sensor can be used to detect a sudden change in orientation of the battery charging enclosure, such as indicating a falling box or instability. Upon detecting a change in orientation, the battery charging enclosure can disable power to the battery charging port. Another example tilt sensor may include the OMRON ELECTRONICS D7E-3.

In various embodiments, the battery charging enclosure may additionally comprise a temperature sensor, such as a thermostat (mechanical or solid state) or thermistor (positive or negative temperature coefficient). An example of a suitable temperature sensor includes the Waterproof Temperature Sensor Probe, Stainless Steel 10k 3950 NTC Thermistor, Digital Temperature Transmitter Extension Cable CPU Temperature Sensor (1M) available from TOFKE. The temperature sensor can be implemented to recognize excessive heat and to disable power to the battery charging port if temperature exceeds a pre-determined threshold.

Each of the components; i.e. smoke detector, flash detector, lid-sensor, accelerometer/tilt-sensor, and temperature sensor, is connected to circuitry 121. The circuitry is further connected to each of the first and second fan assemblies the battery-charging port, and a power source (See FIG. 9). In this regard, the circuitry is configured to control power supply between the power source 122 and each of the first and second fan assemblies 106/107, respectively, and the battery-charging port 123 based on input associated with the componentry.

FIG. 5 shows a rear plan view of the battery charging enclosure. Here, the lid portion 102 is shown in a closed configuration with respect to the receptacle portion 101, and the hinge portion 113 of the preferred embodiment is identified. The cable-routing aperture 111 is shown, as well as optional fasteners 114 for adjoining the insulation layer.

Figure 6:
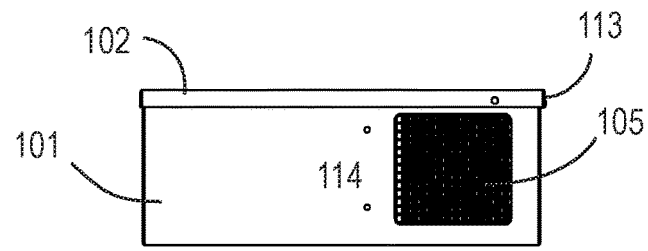
FIG. 6 shows a right-side plan view of the battery charging enclosure.

FIG. 6 shows a right-side plan view of the battery charging enclosure (first side). Here, the lid portion 102 is shown in a closed configuration with respect to the receptacle portion 101. An air-flow screen 105 is shown, as well as optional fasteners 114 for adjoining the insulation layer.

Figure 7:
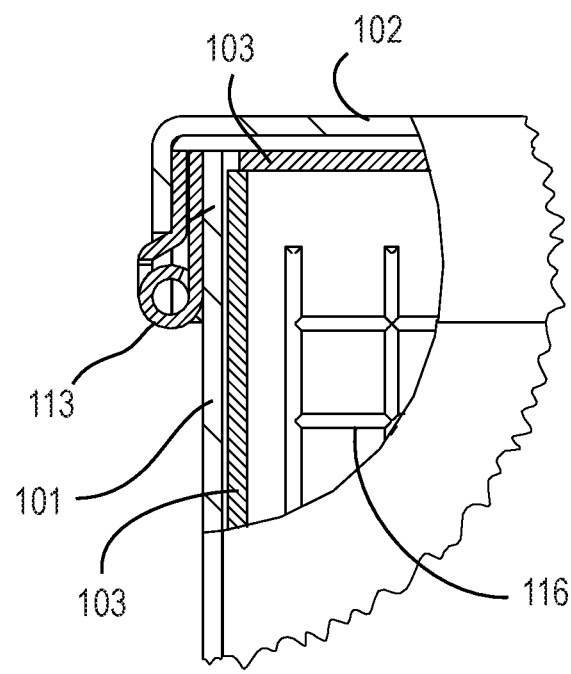
FIG. 7 illustrates features of the battery charging enclosure with respect to a portion as-illustrated in FIG. 2.

FIG. 7 illustrates features of the battery charging enclosure with respect to a portion as-illustrated in FIG. 2. Here, an exploded view of the corner portion of the enclosure is shown. The lid portion 102 is attached to the receptacle portion 101 via the hinge portion 113. While not necessarily to scale, the inside of the lid portion and receptacle portion are covered by the insulation layer 103. Optional grid-reinforcements 116 can be incorporated to improve strength of the enclosure for resisting penetration of materials in the event of an explosion or other catastrophic battery charging failure.

Figure 8:
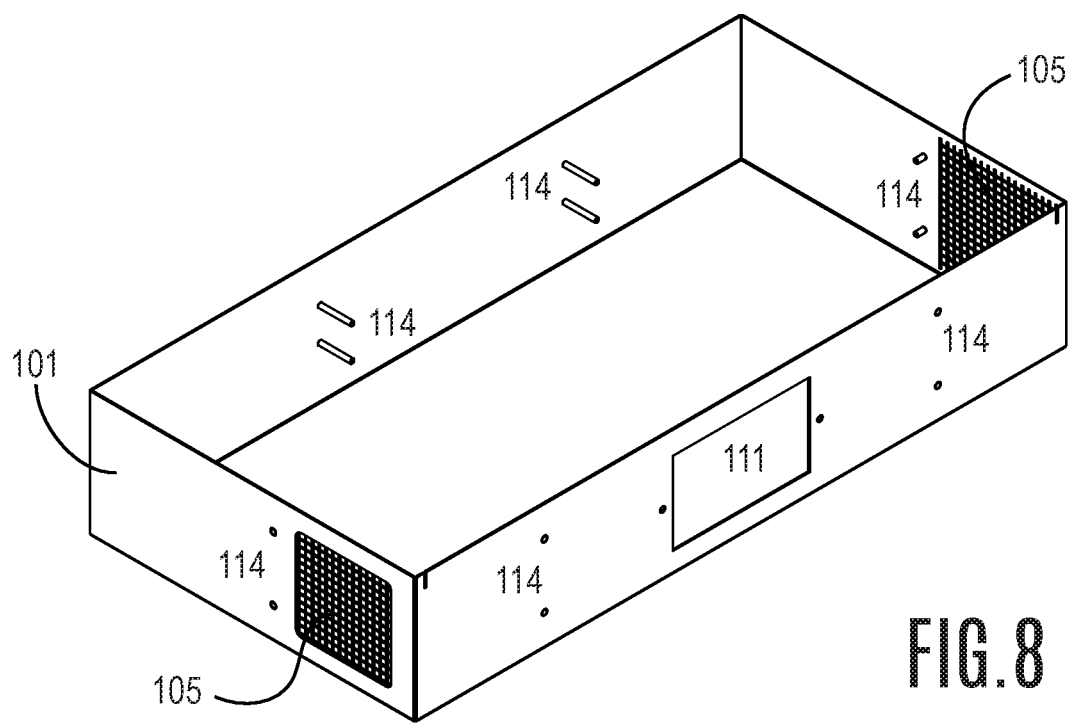
FIG. 8 shows an alternative perspective view of the battery charging enclosure.

FIG. 8 shows an alternative perspective view of the battery charging enclosure (lid portion removed). The rear-side with the cable-routing aperture 111 is further detailed. Fasteners 114 for securing the insulation layer to the outer shell portions are shown (insulation layer omitted for clarity).

Figure 9:
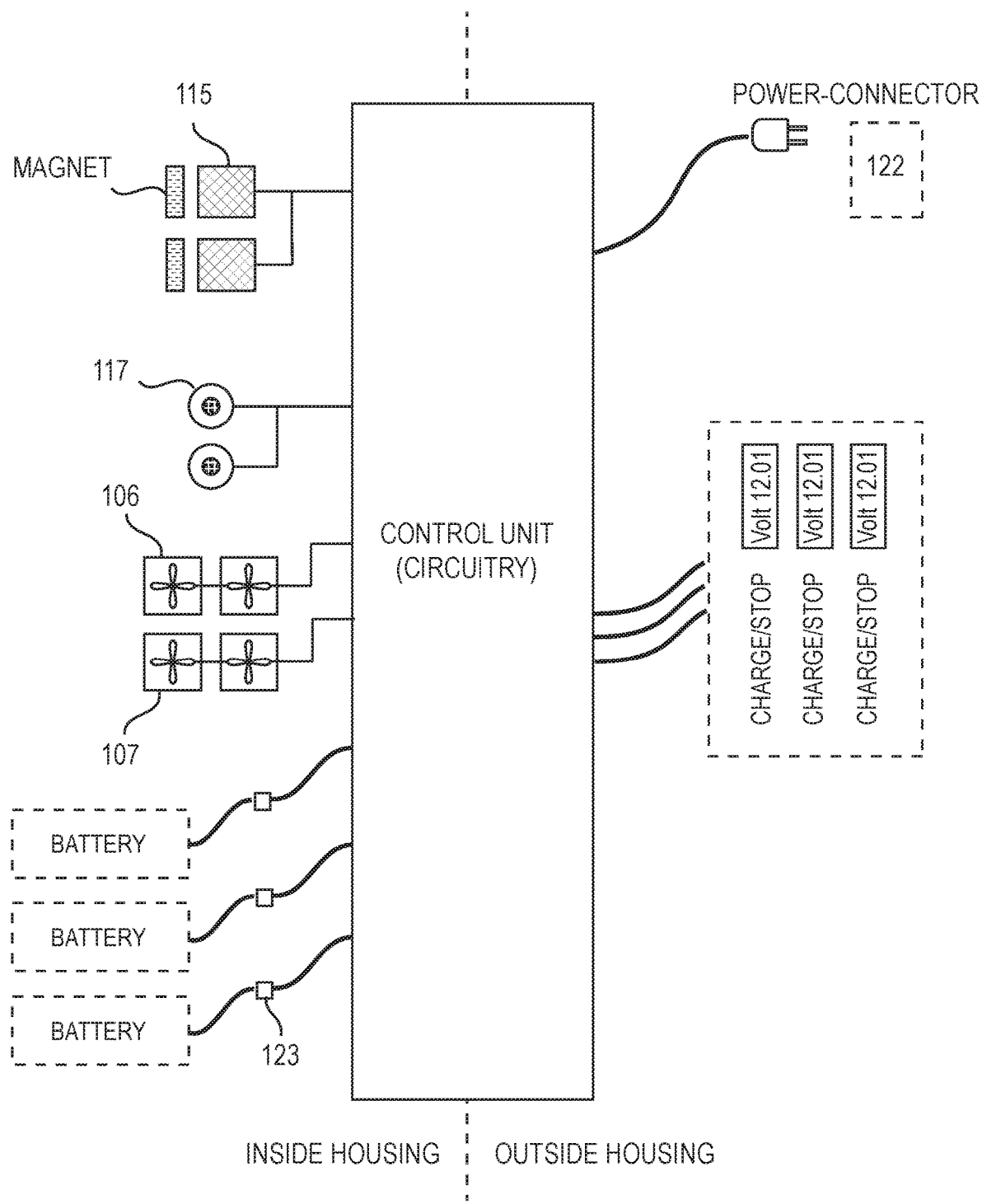
FIG. 9 shows a schematic representation of the battery charging enclosure.

FIG. 9 shows a schematic representation of the battery charging enclosure. Here, latch sensor(s) 115 and corresponding magnets, smoke detectors 117, fans 116, and battery charging ports 123 are each coupled to the circuitry for receiving their corresponding commands. While certain componentry is illustrated, it will be understood to one having skill in the art that other componentry may be similarly implemented. Batteries (represented in broken lines indicating that they do not form part of the battery charging enclosure) are coupled to the battery charging ports 123 for receiving a charge. An external charger (also represented in broken lines) is provided separately or together with the control unit and regulates charging of the batteries. Any components of the componentry may be optionally integrated with the circuitry to form a battery charging enclosure having the features and advantages as described herein.

Therefore, in accordance with the illustrated and other embodiments, is disclosed a battery charging enclosure.

In a preferred embodiment, the battery charging enclosure comprises: an outer shell comprising a receptacle portion, and a lid portion coupled to the receptacle portion; an insulation layer covering a surface of each of the receptacle portion and the lid portion; a first fan assembly disposed at a first side of the enclosure and configured to communicate air-flow from an external environment into an internal volume of the enclosure; a second fan assembly disposed at a second side of the enclosure and configured to communicate the air-flow from within the internal volume of the enclosure to the external environment; a battery-charging port configured to couple with a battery for providing a battery-charging function to the battery; componentry comprising: a smoke detector, a flash detector, a temperature sensor, a lid sensor, or a combination thereof; and circuitry coupled to the componentry and further coupled to each of the first and second fan assemblies the battery-charging port, and a power source; wherein the circuitry is configured to control power supply between the power source and each of the first and second fan assemblies and the battery-charging port based on input associated with the componentry.

The componentry of the battery charging enclosure may further comprise a smoke detector, flash detector and lid sensor.

Each of the first and second fan assemblies may individually comprise one or more of: an electric fan, a mesh, and spheres being combined to form the respective assembly.

The outer shell can be manufactured or formed of steel or aluminum.

The mesh may comprise a metal mesh material.

The filter may comprise a metal filter having one or more slits.

The insulation layer may comprise: cement, perlite, vermiculite, or a combination thereof.

The battery charging enclosure may further comprise a cable-routing aperture for routing a configuration of the charger and related cables.

The battery charging enclosure may further comprise an accelerometer for detecting a spatial interruption, such as a drop, for automatically shutting down the charging of batteries and/or preventing fire. Thus, upon detecting a change in orientation of the enclosure at the accelerometer, the circuitry may be configured to disable power to each of the first and second fan assemblies and the battery-charging port.

The battery charging enclosure may include a view window embedded in the lid portion or elsewhere on the enclosure to provide external view access for examining the contents within the internal volume of the enclosure.

Upon detecting smoke at the smoke detector, the circuitry may be configured to disable power to each of the first and second fan assemblies and the battery-charging port.

Upon detecting flash fire at the flash detector, the circuitry may be configured to disable power to each of the first and second fan assemblies and the battery-charging port.

FEATURES LIST battery charging enclosure (100)
outer shell/receptacle portion (101)
outer shell/lid portion (102)
insulation layer (103)
interior volume (104)
air-flow screen (105)
first fan assembly (106)
second fan assembly (107)
electric fan (108)
mesh (109)
ball bearings (110)
cable-routing aperture (111)
view-window (112)
hinge portion (113)
fasteners (114)
lid-sensors (115)
grid-reinforcements (116)
smoke detector (117)
flash detector (118)
temperature sensor (119)
accelerometer (120)
circuitry (121)
external power source (122)
battery-charging port (123)

What is claimed is:

1. A battery charging enclosure, comprising:
    an outer shell comprising a receptacle portion, and a lid portion coupled to the receptacle portion;
    an insulation layer covering a surface of each of the receptacle portion and the lid portion;
    a first fan assembly disposed at a first side of the enclosure and configured to communicate air-flow from an external environment into an internal volume of the enclosure;
    a second fan assembly disposed at a second side of the enclosure and configured to communicate the air-flow from within the internal volume of the enclosure to the external environment;
    a battery-charging port configured to couple with a battery for providing a battery-charging function to the battery;
    componentry comprising:
        a smoke detector,
        a flash detector,
        a temperature sensor,
        a lid sensor, or
        a combination thereof; and
    circuitry disposed within the outer shell, the circuitry being coupled to the componentry and further coupled to each of the first and second fan assemblies the battery-charging port, and a power source;
    wherein the circuitry is configured to control power supply between the power source and each of the first and second fan assemblies and the battery-charging port based on input associated with the componentry.

2. The battery charging enclosure of claim 1, wherein the componentry comprises each of: said smoke detector, flash detector and lid sensor.

3. The battery charging enclosure of claim 1, wherein each of the first and second fan assemblies individually comprises one or more of: an electric fan, a mesh, and spheres being combined to form the respective assembly.

4. The battery charging enclosure of claim 1, wherein the outer shell is formed of steel or aluminum.

5. The battery charging enclosure of claim 3, wherein the mesh comprises a metal mesh material.

6. The battery charging enclosure of claim 3, wherein the filter comprises a metal filter having one or more slits.

7. The battery charging enclosure of claim 1, wherein the insulation layer comprises: cement, perlite, vermiculite, or a combination thereof.

8. The battery charging enclosure of claim 1 further comprising a cable-routing aperture.

9. The battery charging enclosure of claim 1, further comprising an accelerometer.

10. The battery charging enclosure of claim 1, further comprising a view window embedded in the lid portion to provide external view access for examining the contents within the internal volume of the enclosure.

11. The battery charging enclosure of claim 1, wherein upon detecting smoke at the smoke detector, the circuitry is configured to disable power to each of the first and second fan assemblies and the battery-charging port.

12. The battery charging enclosure of claim 1, wherein upon detecting flash fire at the flash detector, the circuitry is configured to disable power to each of the first and second fan assemblies and the battery-charging port.

13. The battery charging enclosure of claim 1, wherein upon detecting a change in orientation of the enclosure at the accelerometer, the circuitry is configured to disable power to each of the first and second fan assemblies and the battery-charging port.

14. The battery charging enclosure of claim 1, wherein first side is opposite the second side.

15. The battery charging enclosure of claim 1, wherein the first and second fan assemblies are in a collinear alignment.

* * * * *